US012551481B2

(12) United States Patent
Chesler et al.

(10) Patent No.: US 12,551,481 B2
(45) Date of Patent: Feb. 17, 2026

(54) MOLECULAR TARGETS FOR ADDICTION

(71) Applicant: The Jackson Laboratory, Bar Harbor, ME (US)

(72) Inventors: Elissa Chesler, Bar Harbor, ME (US); Michael Saul, Bar Harbor, ME (US)

(73) Assignee: The Jackson Laboratory, Bar Harbor, ME (US)

( * ) Notice: Subject to any disclaimer, the term of this patent is extended or adjusted under 35 U.S.C. 154(b) by 815 days.

(21) Appl. No.: 17/787,233

(22) PCT Filed: Dec. 18, 2020

(86) PCT No.: PCT/US2020/065941
§ 371 (c)(1),
(2) Date: Jun. 17, 2022

(87) PCT Pub. No.: WO2021/127391
PCT Pub. Date: Jun. 24, 2021

(65) Prior Publication Data
US 2023/0057844 A1 Feb. 23, 2023

Related U.S. Application Data

(60) Provisional application No. 62/951,417, filed on Dec. 20, 2019.

(51) Int. Cl.
| | |
|---|---|
| *A61K 31/4985* | (2006.01) |
| *A61K 31/4045* | (2006.01) |
| *A61K 31/422* | (2006.01) |
| *A61P 25/30* | (2006.01) |

(52) U.S. Cl.
CPC ...... *A61K 31/4985* (2013.01); *A61K 31/4045* (2013.01); *A61K 31/422* (2013.01); *A61P 25/30* (2018.01)

(58) Field of Classification Search
CPC ............................ A61K 31/4985; A61P 25/30
See application file for complete search history.

(56) References Cited

U.S. PATENT DOCUMENTS

| | | | |
|---|---|---|---|
| 4,847,281 A | 7/1989 | Tyers | |
| 5,051,426 A * | 9/1991 | Parnell | A61K 31/48 514/812 |
| 2004/0023948 A1 | 2/2004 | Green et al. | |
| 2008/0234237 A1 | 9/2008 | Maddaford et al. | |
| 2014/0200200 A1 | 7/2014 | Piazza et al. | |
| 2016/0207921 A1 | 7/2016 | Armer et al. | |
| 2018/0251840 A1 | 9/2018 | Johnson | |
| 2023/0057844 A1 | 2/2023 | Chelser et al. | |

FOREIGN PATENT DOCUMENTS

| | | |
|---|---|---|
| EP | 0 952 154 A2 | 10/1999 |
| WO | WO 00/39128 A1 | 7/2000 |
| WO | WO 2012/048710 A1 | 4/2012 |

OTHER PUBLICATIONS

Garcia et al. International Journal of Neuropsychopharmacology (2017) 20(8): 644-653 (Year: 2017).*
Vythilingum et al. BMC Psychiatry 2005, 5:31, 5 pages (Year: 2005).*
Brunner et al., Pharmacological validation of candidate causal sleep genes identified in an N2 cross. J Neurogenet. Dec. 2011;25(4):167-81. doi: 10.3109/01677063.2011.628426. Author Manuscript, 25 pages.
Cao et al., Associations of the 5-hydroxytryptamine (serotonin) receptor 1B gene (HTR1B) with alcohol, cocaine, and heroin abuse. Am J Med Genet B Neuropsychiatr Genet. Mar. 2013;162B(2):169-76. doi: 10.1002/ajmg.b.32128. Epub Jan. 17, 2013.
Filip et al., Behavioral evidence for the significance of serotoninergic (5-HT) receptors in cocaine addiction. Addict Biol. Jul. 2010;15(3):227-49. doi: 10.1111/j.1369-1600.2010.00214.x. Epub Apr. 29, 2010.
Müller et al., The role of serotonin in drug use and addiction. Behav Brain Res. Jan. 15, 2015;277:146-92. doi: 10.1016/j.bbr.2014.04.007. Epub Apr. 25, 2014.
Saul et al., The 5-HT1D receptor modulates volitional cocaine-related behaviors. Abstract of poster presented at NIDA GECCRT. 2021. Accessed May 9, 2024 from <https://nida.nih.gov/sites/default/files/abstracts/Saul-Michael.pdf> and <https://www.jax.org/-/media/jaxweb/fifes/research-and-faculty/cvs/michael-saul-cv.pdf>. 2 pages.
Bergen et al., Candidate genes for anorexia nervosa in the 1p33-36 linkage region: serotonin 1D and delta opioid receptor loci exhibit significant association to anorexia nervosa. Mol Psychiatry. Apr. 2003;8(4):397-406. doi: 10.1038/sj.mp.4001318.
Chesler et al., The Collaborative Cross at Oak Ridge National Laboratory: developing a powerful resource for systems genetics. Mamm Genome. Jun. 2008;19(6):382-9. doi: 10.1007/s00335-008-9135-8. Epub Aug. 21, 2008.
Dickson et al., Association of novelty-related behaviors and intravenous cocaine self-administration in Diversity Outbred mice. Psychopharmacology (Berl). Mar. 2015;232(6):1011-24. doi: 10.1007/s00213-014-3737-5. Epub Sep. 20, 2014.
Garcia et al., Preclinical Evidence That 5-HT1B Receptor Agonists Show Promise as Medications for Psychostimulant Use Disorders. Int J Neuropsychopharmacol. Aug. 1, 2017;20(8):644-653. doi: 10.1093/ijnp/pyx025. Erratum in: Int J Neuropsychopharmacol. Oct. 1, 2018;21(10):978.
Garcia et al., Preclinical support for the therapeutic potential of zolmitriptan as a treatment for cocaine use disorders. Transl Psychiatry. Aug. 3, 2020;10(1):266. doi: 10.1038/s41398-020-00956-6.
Saul et al., High-Diversity Mouse Populations for Complex Traits. Trends Genet. Jul. 2019;35(7):501-514. doi: 10.1016/j.tig.2019.04.003. Epub May 24, 2019.

* cited by examiner

Primary Examiner — James D. Anderson
(74) Attorney, Agent, or Firm — Wolf, Greenfield & Sacks, P.C.

(57) ABSTRACT

Provided herein are methods and compositions for the treatment or prevention of certain disorders and conditions, for example, addiction using an agent to modulate 5-hydroxytryptamine 1D receptor (HTR1D) activity and/or expression. Also provided are methods for screening a candidate to determine if the candidate is suitable for the therapies disclosed herein.

7 Claims, 5 Drawing Sheets

Specification includes a Sequence Listing.

US 12,551,481 B2

MOLECULAR TARGETS FOR ADDICTION

RELATED APPLICATIONS

This application is a national stage filing under 35 U.S.C. § 371 of international application number PCT/US2020/065941, filed Dec. 18, 2020, which was published under PCT Article 21 (2) in English and claims the benefit under 35 U.S.C. § 119 (e) of U.S. provisional application No. 62/951,417, filed Dec. 20, 2019, each of which is incorporated by reference herein in its entirety.

GOVERNMENT LICENSE RIGHTS

This invention was made with government support under P50 DA039841 and R01 DA037927 awarded by National Institutes of Health. The government has certain rights in the invention.

REFERENCE TO A SEQUENCE LISTING SUBMITTED AS A TEXT FILE VIA EFS-WEB

This application contains a Sequence Listing that has been submitted in ASCII format via EFS-Web and is hereby incorporated by reference in its entirety. Said ASCII copy, created on Jun. 17, 2022, is named J022770073US01-SEQ-HJD and is 6,872 bytes in size.

BACKGROUND

Addiction is a chronic, relapsing disease characterized by a psychological and physiological inability to stop consuming a chemical, drug, activity, or substance, even though it causes psychological and/or physiological harm. Most treatments are psychosocial, designed to eliminate or decrease addictive behaviors and reduce the likelihood of relapse after successful treatment. The success rate of such treatments is low; therefore, addiction is also a costly personal and public health issue.

SUMMARY

Some aspects of the present disclosure provide a method of treating a substance use addiction in a subject, comprising administering to a subject in need thereof a serotonin 1D receptor (HTR1D) agonist.

In some embodiments, the subject is genetically predisposed to an addiction. In some embodiments, the subject has been treated for an addiction.

In some embodiments, the substance use addiction is selected from non-prescription drug addiction, prescription drug addiction, alcohol addiction, and nicotine addiction. In some embodiments, the non-prescription drug addiction is cocaine addiction.

Other aspects of the present disclosure provide a method of treating a behavioral addiction in a subject, comprising administering to a subject in need thereof a serotonin 1D receptor (HTR1D) agonist.

Yet other aspects of the present disclosure provide uses of a serotonin 1D receptor (HTR1D) agonist in the manufacture of a medicament for the treatment of a substance use addiction in a subject in need thereof.

Still other aspects of the present disclosure provide uses of a serotonin 1D receptor (HTR1D) agonist in the manufacture of a medicament for the treatment of a behavioral addiction in a subject in need thereof.

In some embodiments, a the HTR1D agonist is a selective HTR1D agonist.

In some embodiments, the HTR1D agonist is sumatriptan, zolmitriptan, or ergotamine.

In some embodiments, the agent is a $5HT_{1B/1D}$ serotonin receptor agonist, for example, zolmitriptan.

In some embodiments, the subject is genetically predisposed to an addiction.

In some embodiments, the subject has been treated for an addiction.

In some embodiments, the behavioral addiction is selected from the group consisting of: gambling addiction, sex addiction, pornography addiction, eating disorders, spending addiction, rage/anger, workaholism, exercise addiction, risk-taking addictions, perfectionism, internet or video game addiction, and compulsive use of an electronic device.

Some aspects of the present disclosure provide methods of treating addiction in a subject, the method comprising administering to the subject an agent that modulates serotonin 1D receptor (HTR1D) activity or a downstream effector (e.g., adenylate cyclase activity). Other aspects of the present disclosure provide methods of modulating HTR1D activity in a subject having an addiction, the method comprising administering to the subject an HTR1D agonist. Further aspects of the present disclosure provide methods of preventing addiction in a subject at risk of addiction, the method comprising administering to the subject an agent that modulates HTR1D activity.

Yet other aspects of the present disclosure provide methods of identifying a candidate subject for serotonin 1D receptor (HTR1D) modulation therapy, the method comprising assaying for HTR1D expression and/or activity levels in a subject having or at risk of an addiction, and identifying the subject as a candidate for HTR1D modulation therapy based on the expression and/or activity levels of HTR1D.

In some embodiments, an agent is an HTR1D agonist. For example, an agent may be sumatriptan or ergotamine. In other embodiments, an agent is an HTR1D antagonist.

In some embodiments, a subject is genetically predisposed to an addiction. In some embodiments, a subject has been treated for an addiction.

In some embodiments, an addiction includes a substance use addiction, a behavioral addition, or both a substance use addiction and a behavioral addiction. In some embodiments, a substance use addiction is selected from non-prescription drug addiction, prescription drug addiction, alcohol addiction, and nicotine addiction. In some embodiments, the non-prescription drug addiction is cocaine addiction.

Also provided herein is the use of an agent that modulates HTR1D expression and/or activity in the manufacture of a medicament for the treatment of addiction in a subject.

DETAILED DESCRIPTION

Figure 1:
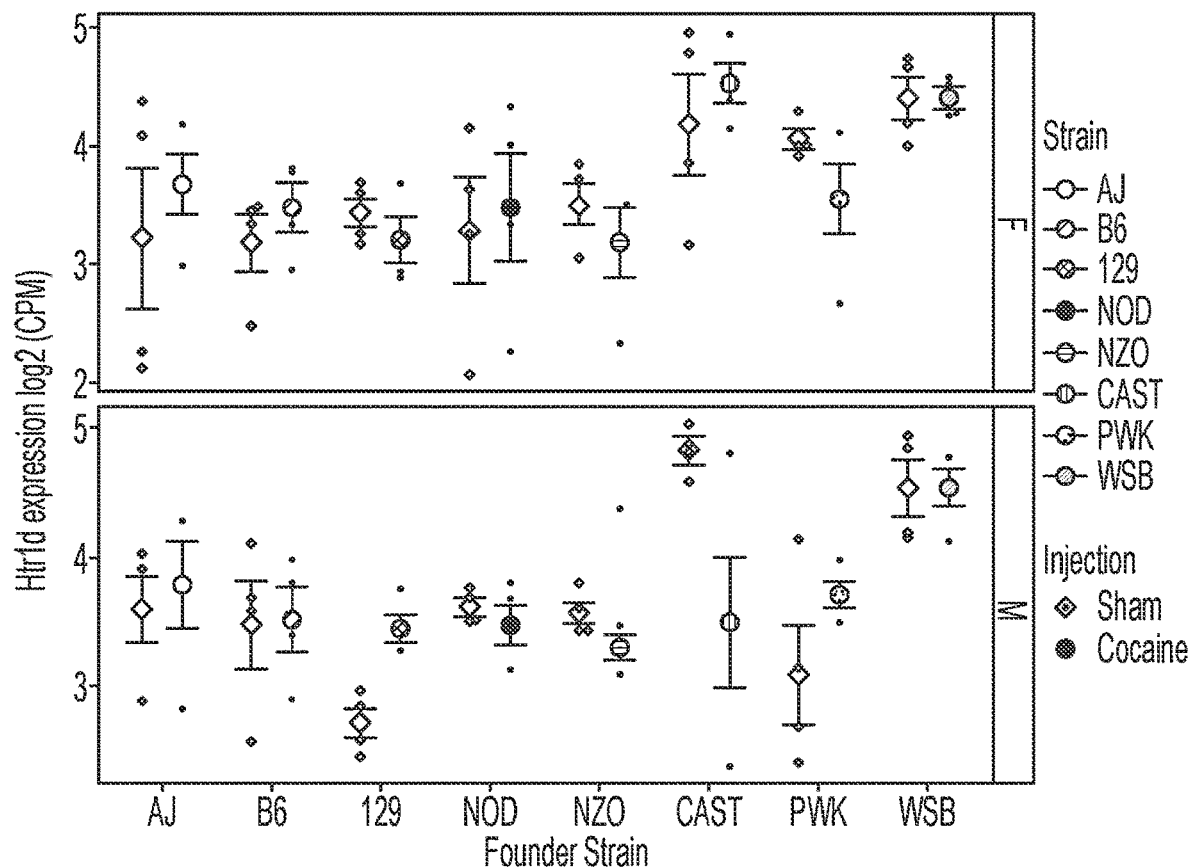
FIG. 1. Htr1d expression pattern in the founders of Collaborative Cross/Diversity Outbred (CC/DO) mice (Jackson Laboratory; Chesler et al. (2008) *Mamm Genome* 19:382-389). In CAST/EiJ males ("CAST" on the bottom panel), cocaine exposure lowered expression of Htr1d. In 129S1/SvImJ males ("129" on the bottom panel), cocaine exposure increased expression of Htr1d. The top panel ("F") shows the results in female counterpart mice.

The present disclosure provides, in some aspects, methods and compositions for treating and/or preventing addiction in a subject by modulating 5-hydroxytryptamine receptor 1D (5-HTR1D) (referred to herein as a "serotonin 1D receptor" or simply "HTR1D") activity and/or expression. For example, a selective HTR1D agonist may be administered to a subject in need thereof to treat addiction, such as cocaine addiction.

The present disclosure also provides, in some aspects, methods of identifying a candidate subject for serotonin 1D receptor modulation therapy.

Addiction

Addiction is a chronic, relapsing disease characterized by a psychological and physiological inability to stop consuming a chemical, drug, or substance, or to stop an activity even though it causes psychological and/or physiological harm. There are currently over 21 million Americans who have a substance use disorder, and drug and alcohol addictions cost the US economy over $600 billion annually. Alcohol abuse alone is responsible for approximately 1 in 10 deaths among adults aged 20-64 years and is estimated to have cost the US economy $249 billion in 2010 (Sacks et al., *Am J Prev Med.* 2015 49(5):e73-e79). Drug overdose deaths accounted for 70,237 deaths in the US during 2017 and cost the US economy over $193 billion annually (CDC, 2018). Opioid addictions have been steadily increasing annually, as approximately 130 Americans die every day from opioid overdoses. In all, opioid addictions cost the US economy at least $631 billion from 2015 to 2018 (Society of Actuaries, 2019). Likewise, tobacco addictions result in over $300 billion in costs annually (Xu et al., *Am J Prev Med.* 2014; 48(3):326-333). Accordingly, addictions are costly; both in terms of mortality and the economy.

There are a wide variety of different addictions that may be treated in accordance with the present disclosure, as it is a complicated disease with a number of different causes. Genetic and environmental factors contribute to an individual's propensity for addiction; however, as the disease progresses, atypical neuronal plasticity may occur within certain brain circuits, leading to the development and maintenance of addiction. For example, the dopaminergic and glutamatergic circuits both have roles in the neuroplasticity associated with addiction; however, there are serotonergic mechanisms involved as well. It is thought that the reward circuitry of the brain may contribute to various addictive disorders. Specifically, stimulation of the ventral tegmental area (VTA), a heterogeneous area of the brain predominantly composed of dopamine and γ-amino butyric acid (GABA) neurons, results in a release of dopamine to projection sites, such as the nucleus accumbens (NAc) (Cooper et al., (2017) *Neurotherapeutics* 14(3):687-697). In the NAc, the dopamine activates its receptors on medium spiny neurons (MSNs), which are GABAergic projection neurons consisting of two classes (D1- or D2-like dopamine receptors). D1 MSNs, increase thalamocortical drive (e.g., rewarding stimuli), while D2 MSNs decrease thalamocortical drive (e.g., aversive stimuli). While activation of VTA dopamine has been found to be a major component of initial reward-related behaviors (e.g., drug seeking behaviors), it is the NAc that seems to be heavily involved in the progression to addiction. Psychostimulants, such as cocaine and amphetamines, have been shown to elevate dopamine levels in synapses, activating dopamine receptors. In addition, these compounds also effect serotonin receptors: for example, self-administered cocaine has been found to inhibit monoamine uptake, resulting in elevated extracellular monoamines, such as serotonin, in a number of structures, including the NAc, VTA, dorsal raphe nucleus, hippocampus, striatum, and cortex (Kirby et al., (2012) *Neuropharmacology* 61(3): 421-432). This elevation, resulting from "acute" cocaine exposure, becomes less noticeable during chronic exposure, resulting in an increased drive for more cocaine. Withdrawal from cocaine results in decreased levels of serotonin throughout the brain, specifically in the NAc, leading to the symptoms described below.

As addictive disorders have a strong neurological component, discontinuing use of an addictive substance (e.g., alcohol, opiates, tranquilizers, cocaine, marijuana, and/or ecstasy) or an addictive behavior generally results in physiological and/or psychological withdrawal symptoms. Therefore, in some embodiments of the present disclosure, a subject is experiencing withdrawal symptoms. In some embodiments, a subject is experiencing physiological, psychological, or a combination of physiological and psychological symptoms of withdrawal. Physiological symptoms of withdrawal include, but are not limited to, grand mal seizure, heart attack, stroke, hallucination, delirium tremens, headaches, dizziness, chest tightness, difficulty breathing, arrhythmia, palpitation, nausea, vomiting, diarrhea, stomach ache, muscle tension, twitches, tremors, shakes, muscle aches, sweating, and tingling sensations. Psychological symptoms of withdrawal include, but are not limited to, anxiety (e.g., generalized anxiety, panic attack, restlessness, irritability), depression (e.g., social isolation, fatigue, poor appetite), sleep abnormalities (e.g., insomnia, difficulty falling asleep or staying asleep), and cognitive difficulties (e.g., poor concentration, poor memory).

There are a number of different addictions, generally classified either as substance use addictions or behavior addictions. In some embodiments, a subject treated in accordance with the present disclosure has a substance use addition. Substance use addictions are characterized by a loss of control over substance use, compulsive substance seeking and craving, and continued use despite negative consequences. A person addicted to a substance typically also experiences physiological and/or psychological dependence on the substance. In some embodiments, the addiction is an addiction to nicotine, alcohol, narcotics, prescription drugs, and/or non-prescription (recreational) drugs. In some embodiments, the addictive substances are selected from the group consisting of stimulants (e.g., psychostimulants), depressants, cannabinoid agonists, and opioid agonists.

In some embodiments, a subject is addicted to a psychostimulant. Psychostimulants are a broad class of sympathomimetic drugs that cause euphoria, increased alertness, and increased physical capacity. Most are non-prescription drugs; however, some, such as ADDERALL® (amphetamine and dextroamphetamine), are prescription drugs. Other examples of psychostimulants include: cocaine, amphetamines (e.g., methamphetamine, ephedrine, cathinone, phentermine, mephentermine, bupropion, methoxyphenamine, selegiline, amfepramone, pyrovalerone, MDMA (ecstasy), DOM (STP)), atomoxetine, dextroamphetamine, methylphenidate, modafinil, lisdexamfetamine, oxymetazoline, pseudoephedrine, phenylephrine, and anabolic steroids. In some embodiments, the addiction is an addiction to cocaine. In some embodiments, the addiction is an addiction to one or more amphetamines. Psychostimulants increase dopamine transmission; however, chronic use results in a reduction of dopamine activity, leading to dysregulation of the brain reward system and dysphoria. Some pharmacotherapeutics, such as desipramine, amantadine and bromocriptine, have been shown to decrease cocaine withdrawal symptoms. Treatment for amphetamine addiction may include administration of phenothiazines, haloperidol, and chlorpromazine for hallucinations, but potential side effects of these can become problematic.

In some embodiments, a subject is addicted to an opiate. Opiates include but are not limited to prescription and non-prescription medications. In some embodiments, the addictive opiate is selected from the group consisting of: buprenorphine, butorphanol, codeine, fentanyl, heroin, hydrocodone, hydrocodone/acetaminophen, hydromorphone, levorphanol, meperidine, methadone, morphine, oxycodone, oxycodone and acetaminophen, oxycodone and naloxone, oxymorphone, tapendtadol, and tramadol. Current treatments involve replacing the addictive drug with an opioid receptor agonist or mixed agonist/antagonist. Alternatively, an opioid receptor antagonist may be administered to block the effect of the agonist. The antagonist does not treat pain or any of the withdrawal symptoms, but precipitates withdrawal. Their use has been associated with increased accidental opioid agonists overdosing and increased lethality. The use of agonists with a lower affinity for the receptors results in less severe withdrawal symptoms; however, it can lead to a dependence on the substitute opiate. Further, many substitution therapies take 3-6 months, allowing time for a subject to stop treatment midway.

In some embodiments, a subject is addicted to nicotine and/or alcohol. Nicotine and alcohol are two of the most commonly abused substances internationally. In some embodiments, the addiction is a nicotine addiction. In some embodiments, the addiction is an alcohol addiction. Medications such as naltrexone, acamprosate, ondansetron, disulfiram, gamma hydroxybutyrate (GHB), and topiramate tested for their potential therapeutic effect on alcohol abuse. However, only a few of the pharmacotherapeutics, naltrexone, acamprosate, and disulfiram, have been approved for the treatment of alcoholism. Among these medications, naltrexone, a non-selective opioid antagonist, is currently considered the pharmacological gold standard. Despite some promising results, none of the medications, including naltrexone, has been found sufficiently efficacious, and prognosis is poor. Likewise, for those with nicotine addictions, nicotine replacement products, anti-depressants, anti-hypersensitives, and behavioral therapy have proven to be only moderately successful.

In some embodiments, a subject treated in accordance with the present disclosure has a behavioral addition. Behavioral addictions (process addictions), include but are not limited to, obsessive-compulsive disorder (OCD), Tourette syndrome, trichotillomania, anorexia, bulimia, anxiety disorder, psychosis, or post-traumatic stress disorder. In some embodiments, the behavioral addiction is selected from the group consisting of: gambling addiction, sex addiction, pornography addiction, eating disorders, spending addiction, rage/anger, workaholism, exercise addiction, risk-taking addictions (e.g., kleptomania and pyromania), perfectionism, internet or video game addiction, or compulsive use of an electronic device. Treatments for behavioral addictions include psychotherapy, psychopharmacotherapy, or a combination of both. Cognitive behavioral therapy (CBT) is the most common form of psychotherapy; subjects learn to identify patterns that trigger compulsive behavior and make lifestyle changes to promote healthier behaviors. There are no medicines approved for the treatment of behavioral addictions; however, medications used for the treatment of drug addictions may also be beneficial for some behavioral addictions (Grant et al. (2010) *Am. J. of Drug and Alcohol Abuse,* 36(5):233-241).

Modulation of the Serotonin 1D Receptor

Figure 2:
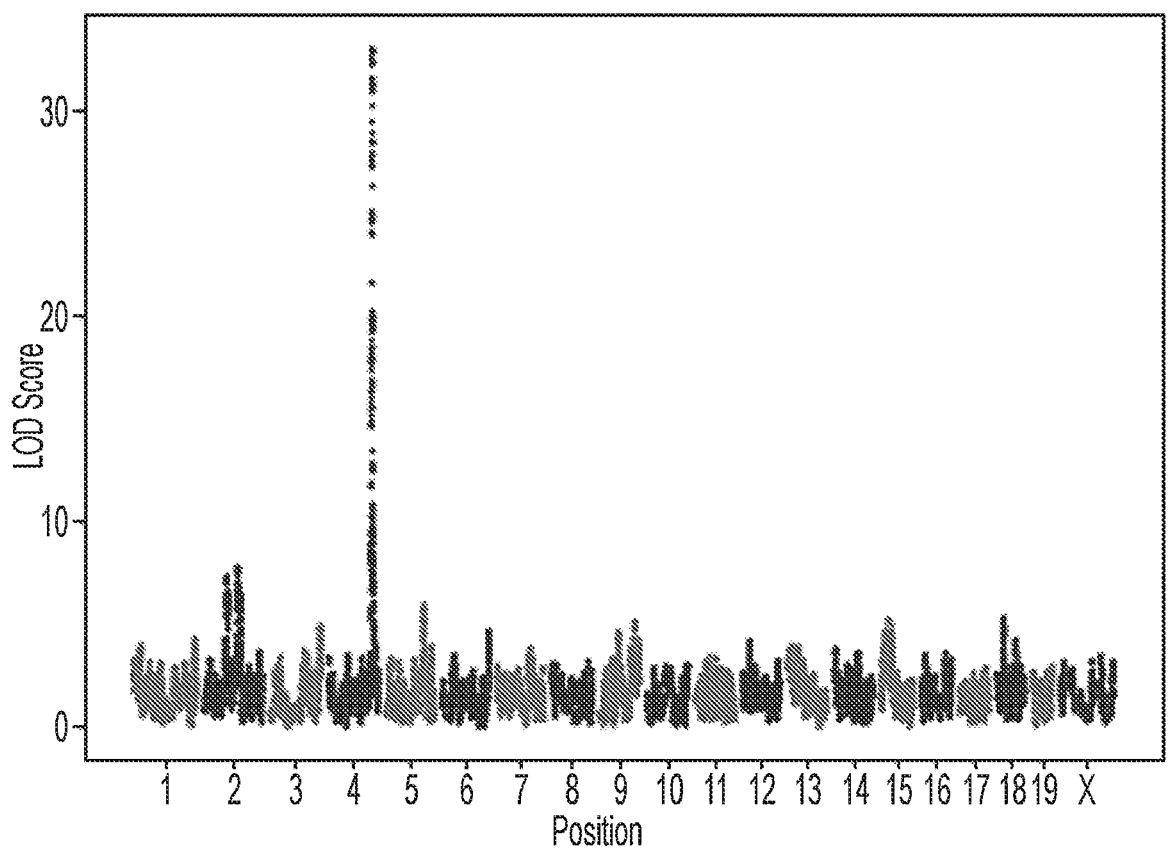
FIG. 2. A striatum expression Quantitative Trait Locus (eQTL) dataset with drug-naïve mice illustrating that Htr1d striatum expression is strongly governed by cis factors (indicated by the high cis-eQTL on Chromosome 4) in the Diversity Outbred mouse population, a heterogeneous stock of the founder strains.
Figure 3:
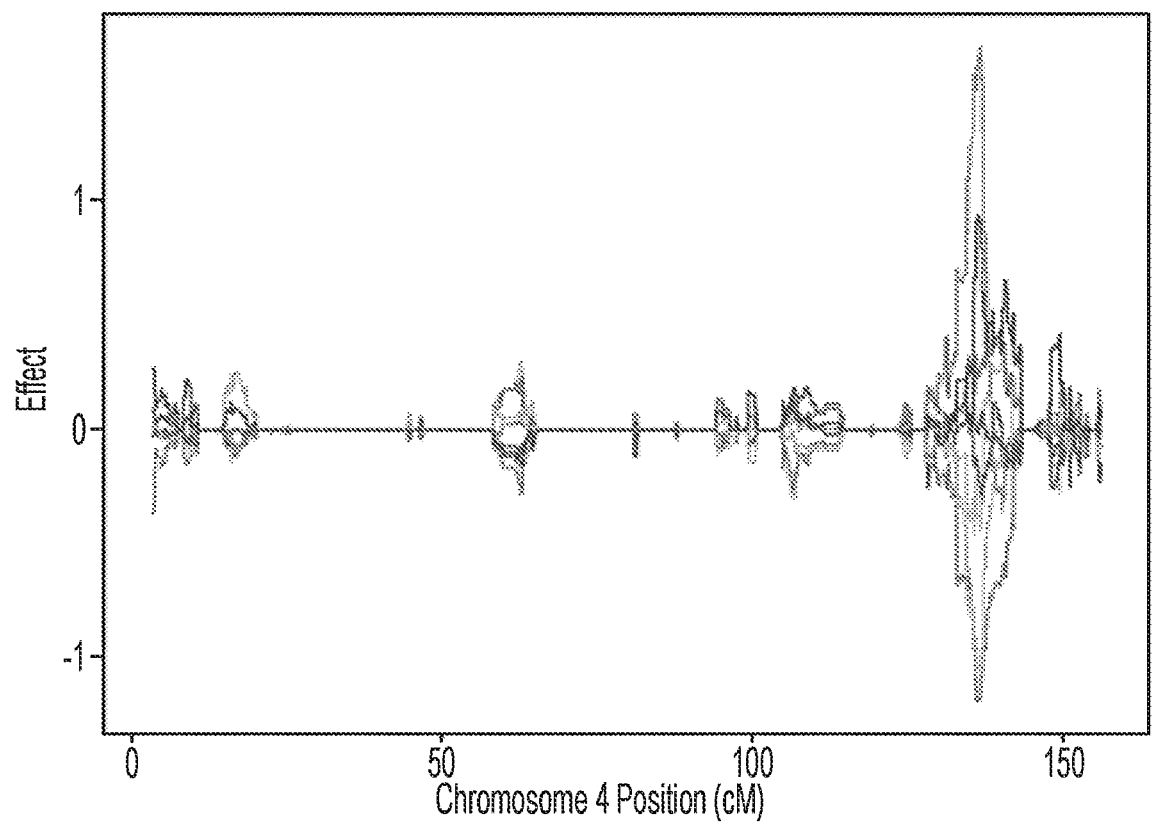
FIG. 3. An effect plot for the Htr1d cis-eQTL indicated that the high Htr1d striatum cis-eQTL on Chromosome 4 is driven by opposing effects from 129S1/SvImJ and CAST/EiJ haplotypes.

In some aspects, the present disclosure provides methods of treating or preventing addiction in a subject by administering an agent that modulates serotonin 1D receptor activity and/or expression. As shown in FIGS. 1-3, Htr1d, a gene encoding the serotonin 1D receptor, was found to be responsive to cocaine exposure in a subset of mice of diverse genetic backgrounds. The serotonin 1D receptor acts on the central nervous system. Serotonin 1D receptors are primarily located in the basal ganglia, hippocampus, cortex, spinal cord, and vascular smooth muscle cells. Ligand binding causes a conformational change that triggers signaling via guanine nucleotide-binding proteins (G proteins), modulating the activity of downstream effectors, such as adenylate cyclase. Specifically, signaling through the receptor inhibits adenylate cyclase activity. The receptor also regulates the release of serotonin in the brain, affecting neural activity, and may also regulate the release of other neurotransmitters. The receptor is thought to play a role in neuropsychiatric disorders, such as depression, and induces vascular vasoconstriction in the brain. Without wishing to be bound by theory, it is thought that modulating (e.g., increasing or decreasing) the activity and/or expression of the serotonin 1D receptor may treat or prevent addiction, withdrawal, and/or relapse.

In some embodiments, the HTR1D protein is a *Homo sapiens* HTR1D, encoded by HTR1D (e.g., Gene ID: 3352). HTR1D is also known as G protein-coupled, serotonin 1D alpha receptor, serotonin receptor 1D, 5-HT-1D-alpha, 5-HT-1D, HTR1DA, HTRL, HT1DA, and RDC4. The sequence of human HTR1D and murine HTRD1 are provided below:

HTR1D [Homo sapiens] (NP_000855.1)
(SEQ ID NO: 1)

```
  1 MSPLNQSAEG LPQEASNRSL NATETSEAWD PRTLQALKIS LAVVLSVITL ATVLSNAFVL

61 TTILLTRKLH TPANYLIGSL ATTDLLVSIL VMPISIAYTI THTWNFGQIL CDIWLSSDIT

121 CCTASILHLC VIALDRYWAI TDALEYSKRR TAGHAATMIA IVWAISICIS IPPLFWRQAK

181 AQEEMSDCLV NTSQISYTIY STCGAFYIPS VLLIILYGRI YRAARNRILN PPSLYGKRFT

241 TAHLITGSAG SSLCSLNSSL HEGHSHSAGS PLFFNHVKIK LADSALERKR ISAARERKAT

301 KILGIILGAF IICWLPFFVV SLVLPICRDS CWIHPALFDF FTWLGYLNSL INPIIYTVFN

361 EEFRQAFQKI VPFRKAS
```

HTR1D [Mus musculus] (AAI03537.1)
(SEQ ID NO: 2)

```
  1 MSPPNQSLEG LPQEASNRSL NATGAWDPEV LQALRISLVV VLSVITLATV LSNAFVLTTI

61 LLTKKLHTPA NYLIGSLATT DLLVSILVMP ISIAYTTTRT WNFGQILCDI WVSSDITCCT

121 ASILHLCVIA LDRYWAITDA LEYSKRRTAG HAAAMIAAVW IISICISIPP LFWRQATAHE

181 EMSDCLVNTS QISYTIYSTC GAFYIPSILL IILYGRIYVA ARSRILNPPS LYGKRFTTAQ

241 LITGSAGSSL CSLNPSLHES HTHTVGSPLF FNQVKIKLAD SILERKRISA ARERKATKTL

301 GIILGAFIIC WLPFFVVSLV LPICRDSCWI HPALFDFFTW LGYLNSLINP VIYTVFNEDF

361 RQAFQKVVHF RKIS
```

Methods of modulating (e.g., increasing or decreasing) the activity and/or expression of the serotonin 1D receptor are known in the art. For example, a biomolecule or chemical agent may be used. In some embodiments, an agent is a polynucleotide (e.g., double-stranded or single-stranded DNA or RNA, such as a guide RNA (gRNA) (e.g., in combination with Cas9), messenger RNA (mRNA), or an RNA interference (RNAi) molecule, such as antisense RNA, small interfering RNAs (siRNAs), short hairpin RNAs (shRNAs), and/or microRNAs (miRNAs)). In some embodiments, an agent is a polypeptide (e.g., protein and/or peptide). Non-limiting examples of polypeptides include antibodies (e.g., monoclonal antibodies and/or antibody fragments, such as single change variable fragments (scFvs)). An agent, in some embodiments, is a cellular agent, such as a stem cell (e.g., pluripotent stem cell, such as an induced pluripotent stem cell). In some embodiments, an agent is small molecule drug (e.g., chemical compound).

In some embodiments, the agent is an agonist or an antagonist agent. Agonist agents are those that partially or fully promote, induce, increase, and/or activate a biological activity of a native polypeptide disclosed herein (e.g., HTR1D). In some embodiments, the agent is an agonist antibody. Examples of HTR1D agonists include, but are not limited to, 5-(nonyloxy)tryptamine, 5-carboxamidotryptam (5-CT), 5-(t-butyl)-N-methyltryptamine, CP-135,807, CP-286,601, dextromethorphan, dihydroergotamine, ergotamine, GR-46611 (3-[3-(2-Dimethylaminoethyl)-1H-indol-5-yl]-N-(4-methoxybenzyl)acrylamide), L-694,247 (2-[5-[3-(4-Methylsulfonylamino)benzyl-1,2,4-oxadiazol-5-yl]-1H-indol-3-yl]ethanamine), L-772,405, methysergide, PNU-109,291 ((S)-3,4-Dihydro-1-[2-[4-(4-methoxyphenyl)-1-piperazinyl]ethyl]-N-methyl-1H-2-benzopyran-6-carboxamide), PNU-142,633 ((1S)-1-[2-[4-[4-(Aminocarbonyl)phenyl]-1-piperazinyl]ethyl]-3,4-dihydro-N-methyl-1H-2-benzopyran-6-carboxamide), triptans (e.g., almotripatan, eletriptan, frovatriptan, naratriptan, rizatriptan, sumatriptan, zolmitriptan), and yohimbine. In some embodiments, the agent is sumatriptan. In some embodiments, the agent is ergotamine.

In some embodiments, the agent is a $5HT_{1B/1D}$ serotonin receptor agonist. For example, the $5HT_{1B/1D}$ serotonin receptor agonist maybe selected from frovatriptan (FROVA®), naratriptan (AMERGE®), rizatriptan (MAXALT®), sumatriptan (IMITREX®), and zolmitriptan (ZOMIG®). In some embodiments, the agent is zolmitriptan. Such use is described, for example, in Garcia et al. *Transl Psychiatry*. 2020 Aug. 3; 10(1): 266, which is incorporated herein by reference in its entirety.

Antagonist agents are those that partially or fully decrease and/or inhibit a biological activity of a native polypeptide disclosed herein (e.g., HTR1D). In some embodiments, the agent is an antagonist antibody. Examples of HTR1D antagonist antibodies include, but are not limited to, BRL-15572, GR-127,935, ketanserin, LY-310,762, LY-367,642, LY-456,219, LY-456,220, metergoline, methiothepin, rauwolscine, ritanserin, vortioxetine, and ziprasidone.

In some embodiments, the agent is a selective agonist or a selective antagonist, that is, the agent is selective for HTR1D by at least 5-fold, at least 6-fold, at least 7-fold, at least 8-fold, at least 9-fold, at least 10-fold, at least 11-fold, at least 12-fold, at least 13-fold, at least 14-fold, at least 15-fold, at least 16-fold, at least 17-fold, at least 18-fold, at least 19-fold, at least 20-fold, at least 25-fold, at least 30-fold, at least 35-fold, at least 40-fold, at least 45-fold, at least 50-fold, at least 55-fold, at least 60-fold, at least 65-fold, at least 70-fold, at least 75-fold, at least 80-fold, at least 85-fold, at least 90-fold, at least 95-fold, at least 100-fold, at least 150-fold, at least 200-fold, at least 250-fold, at least 300-fold, at least 350-fold, at least 400-fold, at least 450-fold, at least 500-fold, at least 600-fold, at least 700-fold, at least 800-fold, at least 900-fold, or at least 1000-fold (e.g., 5-fold-1000-fold) relative to other serotonin receptors (e.g., 5-HT$_{1A}$, 5-HT$_{1B}$, 5-HT$_{1E}$, 5-HT$_{1F}$, 5-HT$_{2A}$, 5-HT$_{2B}$, 5-HT$_{2C}$, 5-HT$_3$, 5-HT$_4$, 5-HT$_{5A}$, 5-HT$_{5B}$, 5-HT$_6$, and/or 5-HT$_7$ receptors).

An agent is considered to increase expression of a gene (e.g., HTR1D) if expression of the gene is increased following exposure of the agent to a cell comprising the gene (e.g., a neuronal cell). In some embodiments, the change in gene expression is relative to a control, such as gene expression from a cell not exposed to the agent. In some embodiments, an agent increases expression of a gene by at least 10%, at least 20%, at least 30%, at least 40%, at least 50%, at least 60%, at least 70%, at least 80%, at least 90%, or at least 100% (e.g., by 10%-100%), relative to a control.

Likewise, an agent is considered to increase activity of a product (e.g., HTR1D protein) encoded by a gene if activity of the product is increased following exposure of the agent to a neuronal cell comprising the gene encoding the protein. In some embodiments, the change in activity is relative to a control, such as activity in a neuronal cell not exposed to the agent. In some embodiments, an agent increases activity of a product by at least 10%, at least 20%, at least 30%, at least 40%, at least 50%, at least 60%, at least 70%, at least 80%, at least 90%, or at least 100% (e.g., by 10%-100%), relative to a control.

In some embodiments, an agent increases expression of a gene (e.g., HTR1D) by at least 1.5-fold, at least 2-fold, at least 3-fold, at least 4-fold, at least 5-fold, at least 6-fold, at least 7-fold, at least 8-fold, at least 9-fold, at least 10-fold, at least 11-fold, at least 12-fold, at least 13-fold, at least 14-fold, at least 15-fold, at least 16-fold, at least 17-fold, at least 18-fold, at least 19-fold, or at least 20-fold (e.g., 1.5 fold-20-fold).

An agent is considered to decrease expression of a gene (e.g., HTR1D) if expression of the gene is decreased following exposure of the agent to a cell comprising the gene (e.g., a neuronal cell). In some embodiments, the change in gene expression is relative to a control, such as gene expression from a cell not exposed to the agent. In some embodiments, an agent decreases expression of a gene by at least 10%, at least 20%, at least 30%, at least 40%, at least 50%, at least 60%, at least 70%, at least 80%, at least 90%, or at least 100% (e.g., by 10%-100%), relative to a control.

Likewise, an agent is considered to decrease activity of a product (e.g., HTR1D protein) encoded by a gene if activity of the product is decreased following exposure of the agent to a neuronal cell comprising the gene encoding the protein. In some embodiments, the change in activity is relative to a control, such as activity in a neuronal cell not exposed to the agent. In some embodiments, an agent decreases activity of a product by at least 10%, at least 20%, at least 30%, at least 40%, at least 50%, at least 60%, at least 70%, at least 80%, at least 90%, or at least 100% (e.g., by 10%-100%), relative to a control.

In some embodiments, an agent decreases expression of a gene (e.g., HTR1D) by at least 1.5-fold, at least 2-fold, at least 3-fold, at least 4-fold, at least 5-fold, at least 6-fold, at least 7-fold, at least 8-fold, at least 9-fold, at least 10-fold, at least 11-fold, at least 12-fold, at least 13-fold, at least 14-fold, at least 15-fold, at least 16-fold, at least 17-fold, at least 18-fold, at least 19-fold, or at least 20-fold (e.g., 1.5 fold-20-fold).

Methods of assessing whether an agent increases or decreases expression and/or activity of a particular gene and/or protein, such as HTR1D are known, and may be used to identify an agent that modulates serotonin 1D receptor expression and/or activity (e.g., small molecule inhibitor screening (e.g., Yip K. W., Liu F F. (2011) Small Molecule Screens. In: Schwab M. (eds) Encyclopedia of Cancer. Springer, Berlin, Heidelberg), RNA interference design (e.g., Reynolds, A., Leake, D., Boese, Q. et al. Rational siRNA design for RNA interference. Nat Biotechnol 22, 326-330 (2004)), production of antibodies, e.g., monoclonal antibodies (e.g., VxP Biologics, Patheon, Pacific Immunology, ProMab, BxCell), etc.).

In some embodiments, the present disclosure provides methods of treating or preventing addiction in a subject by administering an agent that modulates the activity of HTR1D downstream effectors (e.g., adenylate cyclase). Adenylate cyclase, also referred to as adenylyl cyclase or adenyl cyclase, is an enzyme that has regulatory roles in cells, catalyzing the formation of cyclic adenosine monophosphate (cAMP) from adenosine triphosphate (ATP). Increases in cAMP signal transduction have been observed in humans following tobacco addictions, as well as in animal models following treatment with addictive drugs, both of which appear to contribute to modifications in neural reward circuitry (Hope et al., *J Neurosci.* 2007, 27(8):1964-1972). Without wishing to be bound by theory, it is thought that modulating (e.g., increasing or decreasing) the activity of adenylate cyclase receptor may treat or prevent addiction, withdrawal, and/or relapse.

Methods of Preventing/Treating Addiction

Provided herein, in some embodiments, are methods of preventing or treating addictive disorders in a subject (e.g., a human subject), the method comprising, for example, administering to the subject an agent that modulates serotonin 1D receptor activity and/or expression.

A subject herein may be a mammalian subject, such as a human subject. In some embodiments, a subject is a non-human primate or a rodent (e.g., mouse or rat), for example, used as animal models. In some embodiments, the subject has an addictive disorder (e.g., a substance use disorder). In some embodiments, the subject is genetically predisposed to addiction. Individuals who are predisposed to addiction include those having Reward Deficiency Syndrome (RDS), which encompasses dopamine resistance and therefore sensory deprivation of the reward circuitry (e.g., pleasure). In some embodiments, the subject has been treated for an addiction (i.e., the subject has an addictive disorder previously). In some embodiments, the subject has one addiction, i.e., the subject is addicted to one substance/behavior or class of substances (e.g., opioids). In some embodiments, the subject is addicted to more than one (e.g., 2, 3, 4, or more) substances or classes of substances. In some embodiments, the subject has at least one substance use disorder and at least one behavioral addiction.

Non-limiting examples of routes of administration include oral (e.g., tablet, capsule, or liquid), intravenous, subcutaneous, inhalation, intranasal, intrathecal, intramuscular, intraarterial, and intraneural. In some embodiments, an agent that modulates serotonin 1D receptor expression and/or activity (e.g., sumatriptan) is administered as a tablet. In other embodiments, an agent that modulates serotonin 1D receptor expression and/or activity (e.g., sumatriptan) is administered subcutaneously.

In some embodiments, the agent that modulates HTR1D expression and/or activity may be administered as part of a composition with a pharmaceutically acceptable excipient. A pharmaceutically acceptable excipient is a pharmacologically inactive material used together with a pharmacologically active material (e.g., HTR1D modulatory agent) to formulate a pharmaceutical composition. Pharmaceutically acceptable excipients comprise a variety of materials known in the art, including but not limited to saccharides (such as glucose, lactose, and the like), preservatives such as antimicrobial agents, reconstitution aids, colorants, saline (such as phosphate buffered saline), and buffers. Any one of the compositions provided herein may include a pharmaceutically acceptable excipient or carrier.

In some embodiments, a therapeutically effective amount of an agent may be administered to a subject to treat or prevent an addictive disorder, withdrawal, and/or relapse. The term treat, as known in the art, refers to the process of alleviating at least one symptom associated with a disease (e.g., addiction). A symptom may be a physiological, psychological, or pathological manifestation of the disease. Symptoms associated with addiction and/or withdrawal depend on the specific addiction, are described elsewhere herein. Treatment may also result in the prevention of a condition as provided herein, and therefore, includes prophylactic treatment (e.g., prevention of an addiction and/or prevention of a relapse). When use prophylactically, the subject is one in which a clinician expects that there is a likelihood for the development of an addiction (e.g., the subject is genetically predisposed to addiction and/or has previously been treated for an addiction).

To treat or prevent an addictive disorder, an agent that modulates the expression and/or activity of the serotonin 1D receptor as provided herein should be administered as a therapeutically effective amount. As used herein, "therapeutically effective amount" refers to an amount of the composition or dose that produces one or more desired responses in the subject (e.g., reduces a subject's craving for an addictive substance, reduces symptoms of withdrawal, etc.). For in vivo purposes, the amount can be one that a clinician would believe may have a clinical benefit for a subject in need thereof. Methods are known for determining a therapeutically amounts of various therapeutic molecules (e.g., modulators of expression and/or activity of HTR1D). Amounts effective will depend on the particular subject being treated; the severity of a condition, disease or disorder; the individual patient parameters including age, physical condition, size and weight; the duration of the treatment; the nature of concurrent therapy (if any); the specific route of administration and like factors within the knowledge and expertise of the skilled medical practitioner. These factors are known to those of ordinary skill in the art and can be addressed with no more than routine experimentation.

As an example, in some embodiments, the agent is sumatriptan, and the dose is/may be, for example, a 25 mg, 50 mg, or 100 mg tablet. In some embodiments, the dose is 5 mg, 10 mg, 15 mg, 20 mg, 25 mg, 30 mg, 35 mg, 40 mg, 50 mg, 55 mg, 60 mg, 65 mg, 70 mg, 75 mg, 80 mg, 85 mg, 90 mg, 95 mg, 100 mg, 105 mg, 110 mg, 115 mg, 120 mg, 125 mg, 130 mg, 135 mg, 140 mg, 145 mg, 150 mg, 155 mg, 160 mg, 165 mg, 170 mg, 175 mg, 180 mg, 185 mg, 190 mg, 195 mg, 200 mg, 205 mg, 210 mg, 215 mg, 220 mg, 225 mg, 230 mg, 235 mg, 240 mg, 245 mg, 250 mg, or more (e.g., 5 mg-250 mg). In some embodiments, the dose is administered as a subcutaneous injection. Exemplary subcutaneous injection doses include 1 mg/mL, 2 mg/mL, 3 mg/mL, 4 mg/mL, 5 mg/mL, 6 mg/mL, 7 mg/mL, 8 mg/mL, 9 mg/mL, 10 mg/mL, 11 mg/mL, 12 mg/mL, 13 mg/mL, 14 mg/mL, 15 mg/mL, or more (e.g., 1 mg/mL-15 mg/mL).

In some embodiments, the agent is zolmitriptan, and the dose may be, for example, a 2.5 mg or 5 mg tablet (e.g., per day). In some embodiments, the dose is 2.5 mg, 5 mg, 10 mg, or 15 mg (e.g., per day).

An agent may be administered to a subject as a single dose or as multiple doses over the course of days, weeks, months, or years. The dose/dosage of an agent may be determined by a skilled medical practitioner, taking into consideration one or more factors, such as type and severity of disease as well as subject age, weight, height, sex, and ethnicity.

Any one of the methods of treatment provided herein may also include administration of an additional therapeutic, such as an additional addiction-specific treatment disclosed herein. Additional therapeutics for addiction or withdrawal (or symptoms thereof) may be administered to any one of the subjects provided herein. Any one of the methods provided herein may include the administration of one or more of these additional therapeutics. Examples of additional therapeutics depend on the addiction(s) and include, but are not limited to, methadone, buprenorphine, naltrexone, acamprosate, disulfiram, and nicotine replacement therapies (e.g., patch, spray, gum, lozenges). In some embodiments, the methods of treatment provided herein also include cognitive behavioral therapy and/or counseling in conjunction with any of the methods described herein.

Methods of Screening Candidate Subjects

Also provided herein, in some aspects, are methods of screening potential candidates for the therapies described herein (i.e., HTR1D modulation therapy). In some embodiments, the methods comprise assaying for HTR1D expression and/or activity levels in a subject having or at risk of an addiction. Methods of assaying for expression and/or activity level are known in the art and include, but are not limited to, PCR, Southern blot, nucleotide sequencing, Western blot, ELISA, or other functional assays.

The subject, in some embodiments, is a human. In some embodiments, the subject is a rodent (e.g., mouse or rat).

The assayed level of HTR1D expression and/or activity in the candidate, in some embodiments, is compared to a control level of HTR1D expression and/or activity. The control level may be determined, for example, from a control individual or control population. A control individual, in some embodiments, is a subject of the same species as the candidate, who does not have an addictive disorder and has never been treated for an addictive disorder. A control population, in some embodiments, is a group of subjects of the same species as the candidate who do not have an addictive disorder and who have never been treated for an addictive disorder. In some embodiments, a control individual is a subject who has acquired a compulsive behavior (e.g., drug self-administration) but has not been exposed to any of the therapies provided herein. Likewise, a control population, in some embodiments, is a group of subjects of the same species as the candidate who have acquired a compulsive behavior (e.g., drug self-administration) but have not been exposed to any of the therapies provided herein. If a candidate has an assayed level of HTR1D expression and/or activity that is different from that of the control (e.g., higher or lower), then the subject may be identified as a candidate for the HTR1D modulation therapy described herein.

For example, a difference may be an increased level of expression of the gene and/or activity of a product encoded by HTR1D (e.g., by at least 0.5-fold, at least 1-fold, at least 1.5-fold, at least 2.0-fold, at least 2.5-fold, at least 3-fold, at least 3.5-fold, at least 4.0-fold, at least 4.5-fold, or at least 5-fold), or a decreased level of expression of the gene and/or activity of a product encoded by a HTR1D (e.g., by at least 0.5-fold, at least 1-fold, at least 1.5-fold, at least 2.0-fold, at least 2.5-fold, at least 3-fold, at least 3.5-fold, at least 4.0-fold, at least 4.5-fold, or at least 5-fold) relative to a control level of expression of the gene and/or activity of a product encoded by HTR1D.

Additional Embodiments

Paragraph 1. A method of treating addiction in a subject, the method comprising administering to the subject an agent that modulates serotonin 1D receptor (HTR1D) expression and/or activity.

Paragraph 2. A method of modulating serotonin 1D receptor (HTR1D) expression and/or activity in a subject having an addiction, the method comprising administering to the subject an HTR1D agonist.

Paragraph 3. A method of preventing addiction in a subject at risk of addiction, the method comprising administering to the subject an agent that modulates serotonin 1D receptor (HTR1D) activity.

Paragraph 4. A method of identifying a candidate subject for serotonin 1D receptor (HTR1D) modulation therapy, the method comprising:
 assaying for HTR1D expression and/or activity levels in a subject having or at risk of an addiction; and
 identifying the subject as a candidate for HTR1D modulation therapy based on the expression and/or activity levels of HTR1D.

Paragraph 5. The method of any one of paragraphs 1-4, wherein the agent is an HTR1D agonist.

Paragraph 6. The method of paragraph 5, wherein the HTR1D agonist is sumatriptan or ergotamine.

Paragraph 7. The method of any one of paragraphs 1-4, wherein the agent is an HTR1D antagonist.

Paragraph 8. The method of any one of the preceding paragraphs, wherein the subject is genetically predisposed to an addiction.

Paragraph 9. The method of any one of the preceding paragraphs, wherein the subject has been treated for an addiction.

Paragraph 10. The method of any one of the preceding paragraphs, wherein the addiction includes a substance use addiction.

Paragraph 11. The method of paragraph 10, wherein the substance use addiction is selected from non-prescription drug addiction, prescription drug addiction, alcohol addiction, and nicotine addiction.

Paragraph 12. The method of paragraph 11, wherein the non-prescription drug addiction is cocaine addiction.

Paragraph 13. The method of any one of the preceding paragraphs, wherein the addiction includes a behavioral addiction.

Paragraph 14. Use of an agent that modulates serotonin 1D receptor (HTR1D) expression and/or activity in the manufacture of a medicament for the treatment of addiction in a subject.

Paragraph 15. The use of paragraph 14, wherein the agent is an HTR1D agonist.

Paragraph 16. The use of paragraph 15, wherein the HTR1D agonist is sumatriptan or ergotamine.

Paragraph 17. The use of paragraph 14, wherein the agent is an HTR1D antagonist.

Paragraph 18. An agent that modulates serotonin 1D receptor (HTR1D) expression and/or activity for use in a method for treating addiction in a subject.

Paragraph 19. The agent of paragraph 18, wherein the agent is an HTR1D agonist.

Paragraph 20. The agent of paragraph 19, wherein the HTR1D agonist is sumatriptan or ergotamine.

Paragraph 21. The agent of paragraph 18, wherein the agent is an HTR1D antagonist.

EXAMPLES

The present disclosure is further illustrated by the following Example. This Example is provided to aid in the understanding of the disclosure and should not be construed as a limitation thereof.

Example 1: Identification of HTR1D as a Target for Addiction Treatment

Identification of a target for addiction treatment was undertaken using Diversity Outbred (DO) stock of mice and the eight founding inbred strains used to generate the DO stock, which are a genetically diverse collect of mice used to validate qualitative trait loci (QTLs) linked to disease susceptibility, drug resistance, or behavioral phenotypes (see, e.g., Saul et al., 2019, *Trends in Genetics* (PMID: 31133439)). DO mice were developed by random outcross mating of 160 incipient Collaborative Cross recombinant inbred mouse lines, which were created by crossing eight unique and genetically diverse inbred mouse strains. As shown in FIG. 1, the eight founding strains were repeatedly exposed to sham (saline) or cocaine over a time course lasting days, and the resulting Htr1d expression was measured. Two different strains of male mice, the CAST/EiJ males and the 129S1/SvlmJ males showed 2-fold expression differences (i.e., Htr1d expression increased in the 129S1/SvlmJ males and decreased in the CAST/EiJ males exposed to cocaine compared to sham). Upregulation after cocaine exposure was also observed in PWK/PhJ males.

Next, a striatum eQTL dataset with drug-naïve DO mice was analyzed for Htr1d expression. As shown in FIG. 2, the expression of Htr1d is strongly influenced by cis factors. An effect plot was also generated (FIG. 3), which demonstrated that much of the effect is driven by the two opposing responsive strains: CAST/EiJ males and the 129S1/SvlmJ males.

Finally, striatum Htr1d expression was found to be significantly correlated to a predictor vector consisting of a linear combination of multiple novelty and sensation-seeking behaviors (p=0.003) (data not shown). The specific predictors and their weights were trained using a separate dataset predicting cocaine intravenous self-administration from novelty and sensation-seeking behavior using canonical correlation as has been previously described (Dickson et al. 2015, *Psychopharmacology* (PMID: 25238945)).

Therefore, Htr1d is a gene that is strongly responsive to cocaine only in males of specific strains. The expression of the gene appears to be governed by genetics. Baseline Htr1d expression is a predictor of self-administration behavior in genetically diverse mice.

Example 2: Htr1d Knockout Mouse Studies

The serotonin receptor 1D knockout mouse line (C57BL/6N-Htr1d$^{tm1.1(KOMP)Vlcg}$/JMmucd) used in this study was derived from the Knockout Mouse Project (KOMP) repository. A colony of these Htr1d knockout mice was rederived from sperm stored at The Jackson Laboratory. After novelty response testing, 8-12 week old mice were each surgically implanted with a jugular catheter with a vascular access button and allowed to recover. Once they recovered, mice were placed into a two-lever operant box for cocaine intravenous self-administration (IVSA). In total, 8 female and 13 male homozygous knockout (Htr1d−/− or KO) mice and 13 female and 13 male homozygous wild-type (Htr1d+/+ or WT) mice were tested.

The cocaine IVSA assay followed the Center for Systems Neurogenetics of Addiction standard operating procedure (SOP) for IVSA. Briefly, mice were allowed to acquire cocaine intravenous self-administration behavior for 5-18 days at fixed ratio 1 (FR-1) on a dose of 1.0 mg/kg cocaine. Acquisition criterion was met when mice: self-administered at least 10 infusions of cocaine for at least 5 consecutive days and showed no more than 20% variation in number of infusions for at least two days. After acquisition, mice were tested on a dose-response curve at FR-1 at the following doses: 0.32 mg/kg cocaine, 0.1 mg/kg cocaine, 0.032 mg/kg cocaine, and a second time at 1.0 mg/kg cocaine. Following dose-response, mice were tested for extinction (no cue lights, no syringe pump sound, and no cocaine) for 3-9 days until they displayed 50% of their baseline active lever presses with no more than 20% variance between the last two days or 9 days had elapsed. After extinction, mice were tested for reinstatement of drug-seeking behavior (cue lights and syringe pump sound restored but no cocaine) for 2 days.

Data were analyzed in R v3.5.1 (R Project for Statistical Computing). Repeated measures ANOVAs were conducted using the lme4 R package for mixed effects modeling and p-values were calculated using the lmerTest R package. Negative binomial GLM results were calculated using the glm.nb function in the MASS R package. False discovery rate corrected p values (q values) were calculated using the Benjamini-Hochberg method. Because previous genomics data (Example 1) and knockout mouse project (KOMP) behavioral data indicated that sex differences manifested in both Htr1d expression and in Htr1d−/− mouse behavior, tests were conducted separately on males and females. Statistical significance was established at thresholds of p values <0.05 and q values <0.20.

All tests from the Htr1d knockout experiment are summarized in Table 1.

Figure 4:
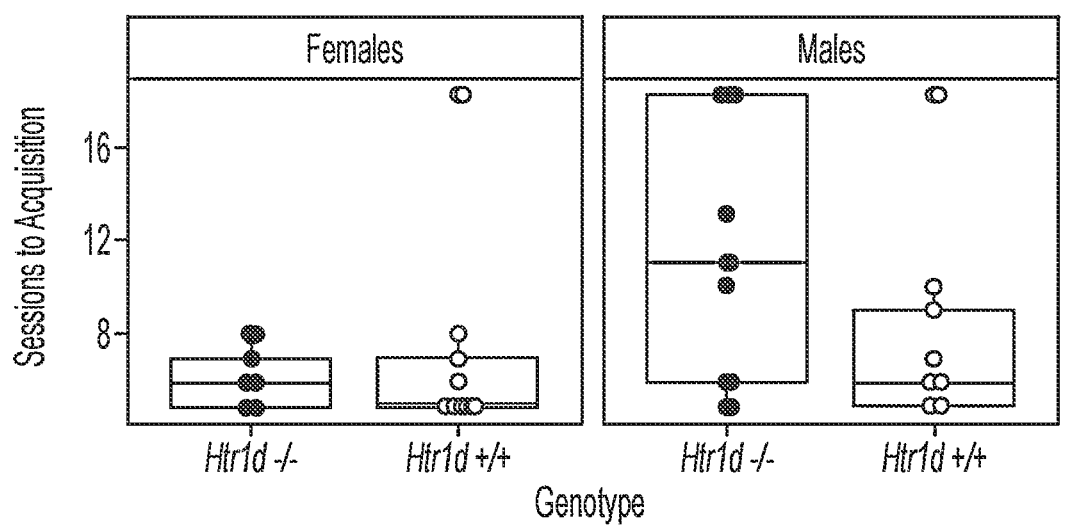
FIG. 4. Two boxplots showing the number of sessions to acquisition in females and in males. Male Htr1d−/− mice took significantly longer to acquire cocaine intravenous self-administration (IVSA) than Htr1d+/+ males (right panel). Females showed no significant differences (left panel).

The acquisition phase showed some differences between Htr1d knockout and wild-type mice. Male Htr1d−/− mice took a significantly longer time to acquire cocaine IVSA than male Htr1d+/+ mice (p=0.036, negative binomial GLM, FIG. 4. Female Htr1d−/− mice did not significantly differ in sessions to acquisition (p=0.37, negative binomial GLM, FIG. 4).

Figure 5:
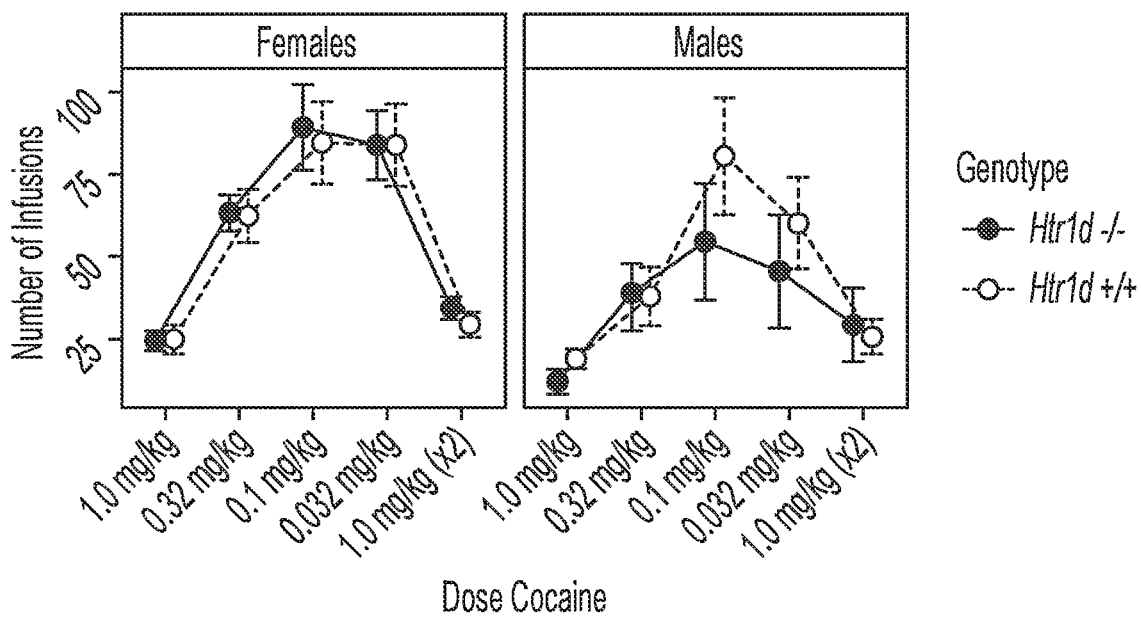
FIG. 5. Two graphs showing infusions of cocaine at varying doses during the dose-response stage of IVSA testing. Neither males nor females showed any genotype-dependent differences in number of infusions at any dose.
Figure 6:
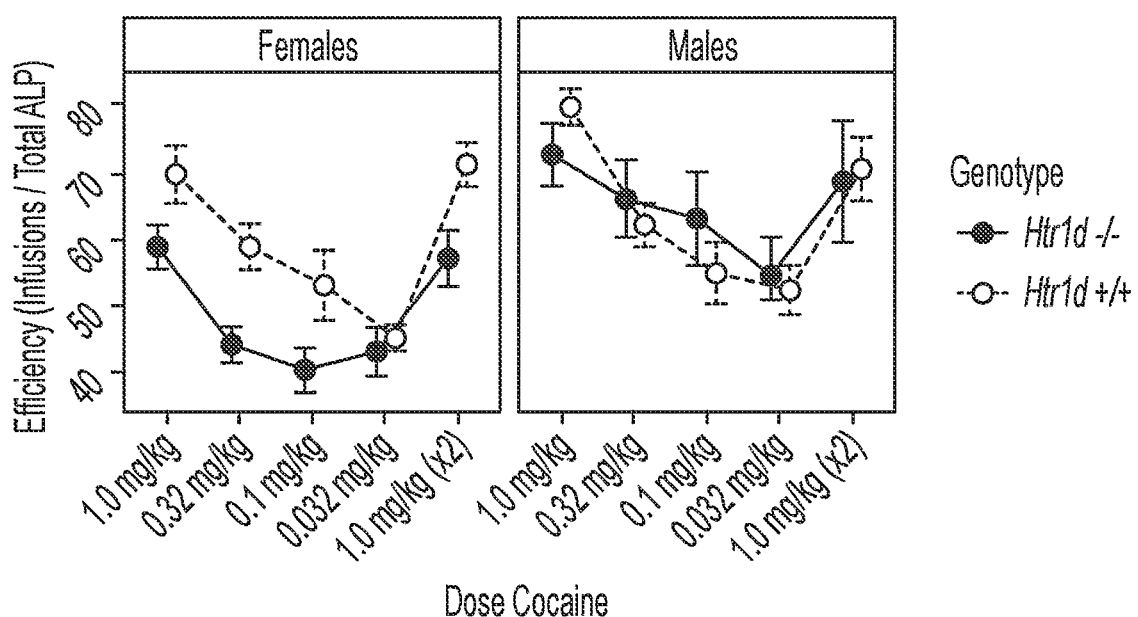
FIG. 6. Two graphs showing the efficiency of cocaine intake (calculated as the ratio of active lever presses leading to infusions over total active lever presses) at varying doses during the dose-response stage of IVSA testing. Females showed a significant dose-independent decrease in efficiency (left panel). No differences in efficiency were observed in the males (right panel).

Dose-response data on cocaine infusions showed no significant differences in either males (p=0.48, repeated measures ANOVA, FIG. 5) or females (p=0.72, repeated measures ANOVA, FIG. 5), indicating that Htr1d−/− mice take approximately the same amount of cocaine as Htr1d+/+ mice. It was observed that Htr1d−/− female mice show significantly lower efficiency (proportion of active lever presses leading to a cocaine infusion) than their Htr1d+/+ females counterparts, regardless of dose of cocaine taken (p=0.007, repeated measures ANOVA, FIG. 6). The reduction in efficiency means that female Htr1d−/− mice press the active lever more times per unit cocaine taken than female Htr1d+/+ mice. This suggests that female Htr1d−/− mice engage in more compulsive drug-seeking relative to their wild-type counterparts. No significant differences were observed in efficiency in males between these two genotypes (p=0.11, repeated measures ANOVA, FIG. 6).

Figure 7:
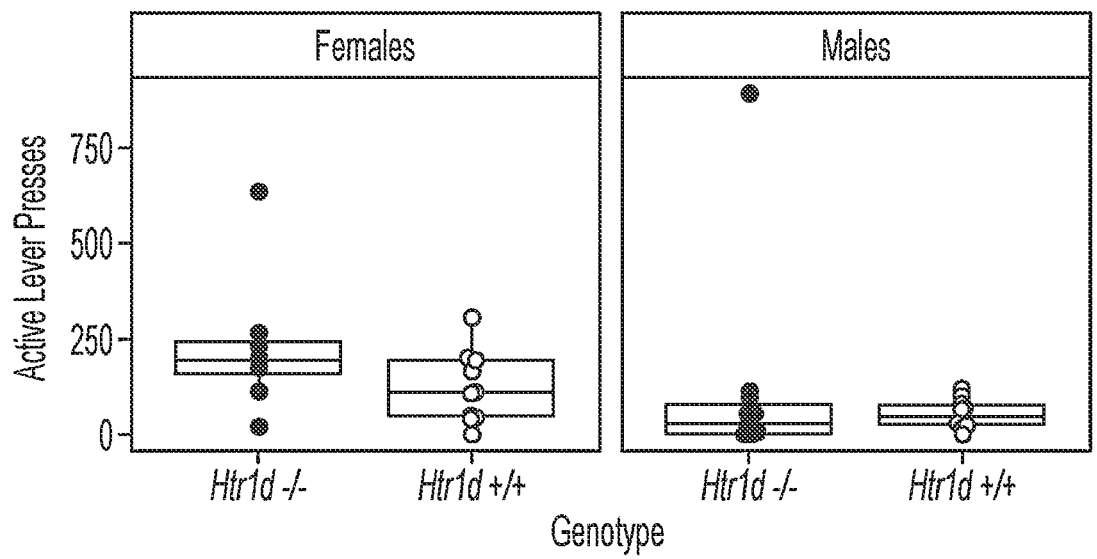
FIG. 7. Two boxplots showing the number of active lever presses during session 2 of the extinction phase. No significant differences were observed in extinction-related lever pressing in either males or females.
Figure 8:
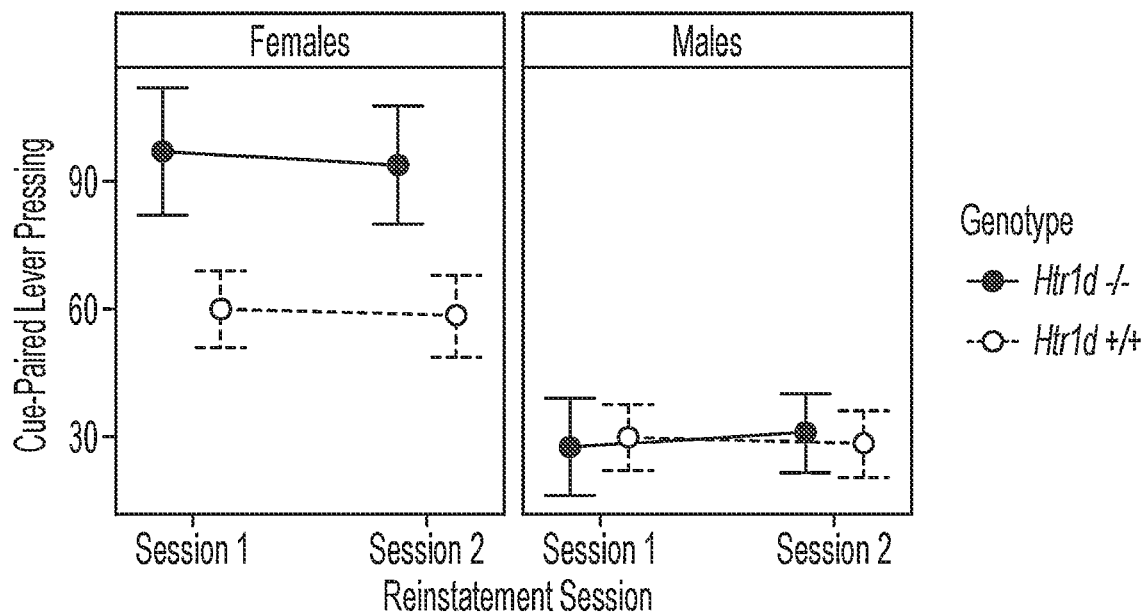
FIG. 8. Two graphs showing reinstatement cue-paired lever pressing. Female Htr1d−/− mice showed significantly higher cue-paired lever pressing than female Htr1d+/+ mice (left panel). No genotype-related difference was observed in males (right panel).

No significant differences were observed during in extinction between Htr1d−/− and Htr1d+/+ mice (males: p=0.47, females p=0.18, two-tailed Welch's t-test, FIG. 7). Significant differences were observed in cue-paired active lever pressing during cue reinstatement in female Htr1d−/− mice relative to their wild-type counterparts (p=0.036, repeated measures ANOVA, FIG. 8), but not in males (p=0.98, repeated measures ANOVA, FIG. 8). This difference in reinstatement indicates a persistent drug-seeking behavior upon the restoration of cues. The reinstatement phenotype is consistent with cue-induced drug-seeking behaviors in humans with substance use disorders.

The Htr1d−/− results demonstrate that the serotonin 1D receptor is related to aspects of addiction, including compulsive use.

TABLE 1

Results from Htrf1d Knockout Experiment

| Stage | Trait | Test | Comparison | p | q | Significant |
|---|---|---|---|---|---|---|
| Acquisition | Sessions to Acquisition | Negative Binomial GLM w/Analysis of Deviance | Females: KO vs WT | 0.37 | 0.60 | . |
| Acquisition | Sessions to Acquisition | Negative Binomial GLM w/Analysis of Deviance | Males: KO vs WT | 0.036 | 0.12 | YES |
| Dose-Response | Infusions | Repeated Measures ANOVA | Females: KO vs WT | 0.72 | 0.80 | . |
| Dose-Response | Infusions | Repeated Measures ANOVA | Males: KO vs WT | 0.48 | 0.60 | . |
| Dose-Response | Efficiency | Repeated Measures ANOVA | Females: KO vs WT | 0.007 | 0.073 | YES |
| Dose-Response | Efficiency | Repeated Measures ANOVA | Males: KO vs WT | 0.11 | 0.27 | . |
| Extinction | Session 2 Active Lever Presses | Two Sample t-test (Welch's, two-sided) | Females: KO vs WT | 0.18 | 0.37 | . |
| Extinction | Session 2 Active Lever Presses | Two Sample t-test (Welch's, two-sided) | Males: KO vs WT | 0.47 | 0.60 | . |
| Reinstatement | Cue-Paired Lever Presses | Repeated Measures ANOVA | Females: KO vs WT | 0.036 | 0.12 | YES |
| Reinstatement | Cue-Paired Lever Presses | Repeated Measures ANOVA | Males: KO vs WT | 0.98 | 0.98 | . |

All references, patents and patent applications disclosed herein are incorporated by reference with respect to the subject matter for which each is cited, which in some cases may encompass the entirety of the document.

The indefinite articles "a" and "an," as used herein the specification and in the claims, unless clearly indicated to the contrary, should be understood to mean "at least one."

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The terms "about" and "substantially" preceding a numerical value mean±10% of the recited numerical value.

Where a range of values is provided, each value between the upper and lower ends of the range are specifically contemplated and described herein.

---

What is claimed is:

1. A method of treating cocaine addiction in a subject, comprising administering to a subject in need thereof a serotonin 1D receptor (HTR1D) agonist selected from sumatriptan and zolmitriptan.

2. The method of claim 1, wherein the subject has been treated for a cocaine addiction.

3. The method of claim 1, wherein the HTR1D agonist is sumatriptan.

4. The method of claim 3, wherein the method comprises administering the sumatriptan via subcutaneous injection at a dose of 1 mg/mL-15 mg/mL.

5. The method of claim 3, wherein the method comprises administering the sumatriptan at a dose of 5 mg-250 mg.

6. The method of claim 1, wherein the HTR1D agonist is zolmitriptan.

7. The method of claim 6, wherein the method comprises administering the zolmitriptan at a dose of 2.5 mg, 5 mg, 10 mg, or 15 mg.

* * * * *

SEQUENCE LISTING

```
<160> NUMBER OF SEQ ID NOS: 2

<210> SEQ ID NO 1
<211> LENGTH: 377
<212> TYPE: PRT
<213> ORGANISM: Homo sapiens

<400> SEQUENCE: 1

Met Ser Pro Leu Asn Gln Ser Ala Glu Gly Leu Pro Gln Glu Ala Ser
1               5                   10                  15

Asn Arg Ser Leu Asn Ala Thr Glu Thr Ser Glu Ala Trp Asp Pro Arg
            20                  25                  30

Thr Leu Gln Ala Leu Lys Ile Ser Leu Ala Val Val Leu Ser Val Ile
        35                  40                  45

Thr Leu Ala Thr Val Leu Ser Asn Ala Phe Val Leu Thr Thr Ile Leu
    50                  55                  60

Leu Thr Arg Lys Leu His Thr Pro Ala Asn Tyr Leu Ile Gly Ser Leu
65                  70                  75                  80

Ala Thr Thr Asp Leu Leu Val Ser Ile Leu Val Met Pro Ile Ser Ile
                85                  90                  95

Ala Tyr Thr Ile Thr His Thr Trp Asn Phe Gly Gln Ile Leu Cys Asp
            100                 105                 110

Ile Trp Leu Ser Ser Asp Ile Thr Cys Cys Thr Ala Ser Ile Leu His
        115                 120                 125

Leu Cys Val Ile Ala Leu Asp Arg Tyr Trp Ala Ile Thr Asp Ala Leu
    130                 135                 140

Glu Tyr Ser Lys Arg Arg Thr Ala Gly His Ala Ala Thr Met Ile Ala
145                 150                 155                 160

Ile Val Trp Ala Ile Ser Ile Cys Ile Ser Ile Pro Pro Leu Phe Trp
                165                 170                 175

Arg Gln Ala Lys Ala Gln Glu Glu Met Ser Asp Cys Leu Val Asn Thr
            180                 185                 190

Ser Gln Ile Ser Tyr Thr Ile Tyr Ser Thr Cys Gly Ala Phe Tyr Ile
        195                 200                 205

Pro Ser Val Leu Leu Ile Ile Leu Tyr Gly Arg Ile Tyr Arg Ala Ala
    210                 215                 220

Arg Asn Arg Ile Leu Asn Pro Pro Ser Leu Tyr Gly Lys Arg Phe Thr
225                 230                 235                 240

Thr Ala His Leu Ile Thr Gly Ser Ala Gly Ser Ser Leu Cys Ser Leu
                245                 250                 255

Asn Ser Ser Leu His Glu Gly His Ser His Ser Ala Gly Ser Pro Leu
            260                 265                 270

Phe Phe Asn His Val Lys Ile Lys Leu Ala Asp Ser Ala Leu Glu Arg
        275                 280                 285
```

```
Lys Arg Ile Ser Ala Ala Arg Glu Arg Lys Ala Thr Lys Ile Leu Gly
            290                 295                 300

Ile Ile Leu Gly Ala Phe Ile Ile Cys Trp Leu Pro Phe Phe Val Val
305                 310                 315                 320

Ser Leu Val Leu Pro Ile Cys Arg Asp Ser Cys Trp Ile His Pro Ala
                325                 330                 335

Leu Phe Asp Phe Phe Thr Trp Leu Gly Tyr Leu Asn Ser Leu Ile Asn
            340                 345                 350

Pro Ile Ile Tyr Thr Val Phe Asn Glu Glu Phe Arg Gln Ala Phe Gln
                355                 360                 365

Lys Ile Val Pro Phe Arg Lys Ala Ser
370                 375

<210> SEQ ID NO 2
<211> LENGTH: 374
<212> TYPE: PRT
<213> ORGANISM: Mus musculus

<400> SEQUENCE: 2

Met Ser Pro Pro Asn Gln Ser Leu Glu Gly Leu Pro Gln Glu Ala Ser
1               5                   10                  15

Asn Arg Ser Leu Asn Ala Thr Gly Ala Trp Asp Pro Glu Val Leu Gln
            20                  25                  30

Ala Leu Arg Ile Ser Leu Val Val Leu Ser Val Ile Thr Leu Ala
        35                  40                  45

Thr Val Leu Ser Asn Ala Phe Val Leu Thr Thr Ile Leu Leu Thr Lys
50                  55                  60

Lys Leu His Thr Pro Ala Asn Tyr Leu Ile Gly Ser Leu Ala Thr Thr
65                  70                  75                  80

Asp Leu Leu Val Ser Ile Leu Val Met Pro Ile Ser Ile Ala Tyr Thr
                85                  90                  95

Thr Thr Arg Thr Trp Asn Phe Gly Gln Ile Leu Cys Asp Ile Trp Val
            100                 105                 110

Ser Ser Asp Ile Thr Cys Cys Thr Ala Ser Ile Leu His Leu Cys Val
            115                 120                 125

Ile Ala Leu Asp Arg Tyr Trp Ala Ile Thr Asp Ala Leu Glu Tyr Ser
130                 135                 140

Lys Arg Arg Thr Ala Gly His Ala Ala Ala Met Ile Ala Ala Val Trp
145                 150                 155                 160

Ile Ile Ser Ile Cys Ile Ser Ile Pro Pro Leu Phe Trp Arg Gln Ala
                165                 170                 175

Thr Ala His Glu Glu Met Ser Asp Cys Leu Val Asn Thr Ser Gln Ile
            180                 185                 190

Ser Tyr Thr Ile Tyr Ser Thr Cys Gly Ala Phe Tyr Ile Pro Ser Ile
        195                 200                 205

Leu Leu Ile Ile Leu Tyr Gly Arg Ile Tyr Val Ala Ala Arg Ser Arg
210                 215                 220

Ile Leu Asn Pro Pro Ser Leu Tyr Gly Lys Arg Phe Thr Thr Ala Gln
225                 230                 235                 240

Leu Ile Thr Gly Ser Ala Gly Ser Ser Leu Cys Ser Leu Asn Pro Ser
                245                 250                 255

Leu His Glu Ser His Thr His Thr Val Gly Ser Pro Leu Phe Phe Asn
            260                 265                 270

Gln Val Lys Ile Lys Leu Ala Asp Ser Ile Leu Glu Arg Lys Arg Ile
```

-continued

```
                275                 280                 285
Ser Ala Ala Arg Glu Arg Lys Ala Thr Lys Thr Leu Gly Ile Ile Leu
    290                 295                 300

Gly Ala Phe Ile Ile Cys Trp Leu Pro Phe Phe Val Val Ser Leu Val
305                 310                 315                 320

Leu Pro Ile Cys Arg Asp Ser Cys Trp Ile His Pro Ala Leu Phe Asp
                325                 330                 335

Phe Phe Thr Trp Leu Gly Tyr Leu Asn Ser Leu Ile Asn Pro Val Ile
            340                 345                 350

Tyr Thr Val Phe Asn Glu Asp Phe Arg Gln Ala Phe Gln Lys Val Val
    355                 360                 365

His Phe Arg Lys Ile Ser
    370
```